US009002611B2

(12) United States Patent
Giddens et al.

(10) Patent No.: US 9,002,611 B2
(45) Date of Patent: Apr. 7, 2015

(54) VEHICULAR BRAKE HYDRAULIC PRESSURE CONTROL APPARATUS

(71) Applicant: Nissin Kogyo Co., Ltd., Ueda-shi, Nagano (JP)

(72) Inventors: Eric Giddens, Marysville, OH (US); Shunichi Miyazawa, Dublin, OH (US)

(73) Assignee: Nissin Kogyo Co., Ltd., Ueda-Shi (JP)

( * ) Notice: Subject to any disclaimer, the term of this patent is extended or adjusted under 35 U.S.C. 154(b) by 153 days.

(21) Appl. No.: 13/723,366

(22) Filed: Dec. 21, 2012

(65) Prior Publication Data
US 2014/0180552 A1 Jun. 26, 2014

(51) Int. Cl.
| | |
|---|---|
| G06F 17/00 | (2006.01) |
| G06F 19/00 | (2011.01) |
| B60T 8/00 | (2006.01) |
| B60T 8/32 | (2006.01) |
| B60T 8/18 | (2006.01) |
| B60T 8/30 | (2006.01) |
| B60T 8/1755 | (2006.01) |
| B60T 8/1766 | (2006.01) |
| B60T 13/66 | (2006.01) |

(52) U.S. Cl.
CPC ............. B60T 8/306 (2013.01); B60T 8/17551 (2013.01); B60T 8/1766 (2013.01); B60T 13/66 (2013.01)

(58) Field of Classification Search
USPC ........ 701/36, 37, 38, 70, 71, 78, 79; 340/438, 340/440; 180/271, 282
See application file for complete search history.

(56) References Cited

U.S. PATENT DOCUMENTS

| | | | | |
|---|---|---|---|---|
| 6,030,056 A | * | 2/2000 | Sawada et al. | 303/113.5 |
| 2002/0024252 A1 | * | 2/2002 | Banno et al. | 303/113.1 |

FOREIGN PATENT DOCUMENTS

JP 4529229 B 11/2001

* cited by examiner

Primary Examiner — Thomas Tarcza
Assistant Examiner — Edward Pipala
(74) Attorney, Agent, or Firm — Rankin, Hill & Clark LLP

(57) ABSTRACT

Pitching is reduced even when strong braking operation is performed during low speed running. A vehicular brake hydraulic pressure control apparatus includes control section that performs pitching reducing control for reducing occurrence of pitching by controlling each control valve unit to switch brake hydraulic pressure between pressure increasing state, pressure decreasing state, and holding state. The control section performs pitching reducing control based on weight distribution ratio between front wheels and rear wheels during deceleration, and includes distribution ratio calculating section for calculating the weight distribution ratio from deceleration of vehicle, vehicle speed calculating section for calculating vehicle speed, and determining section for determining whether or not to perform pitching reducing control, wherein the determining section determines to perform pitching reducing control if conditions are satisfied, the conditions including at least that the calculated vehicle speed is lower than a predetermined speed and that braking operation is being operated.

9 Claims, 6 Drawing Sheets

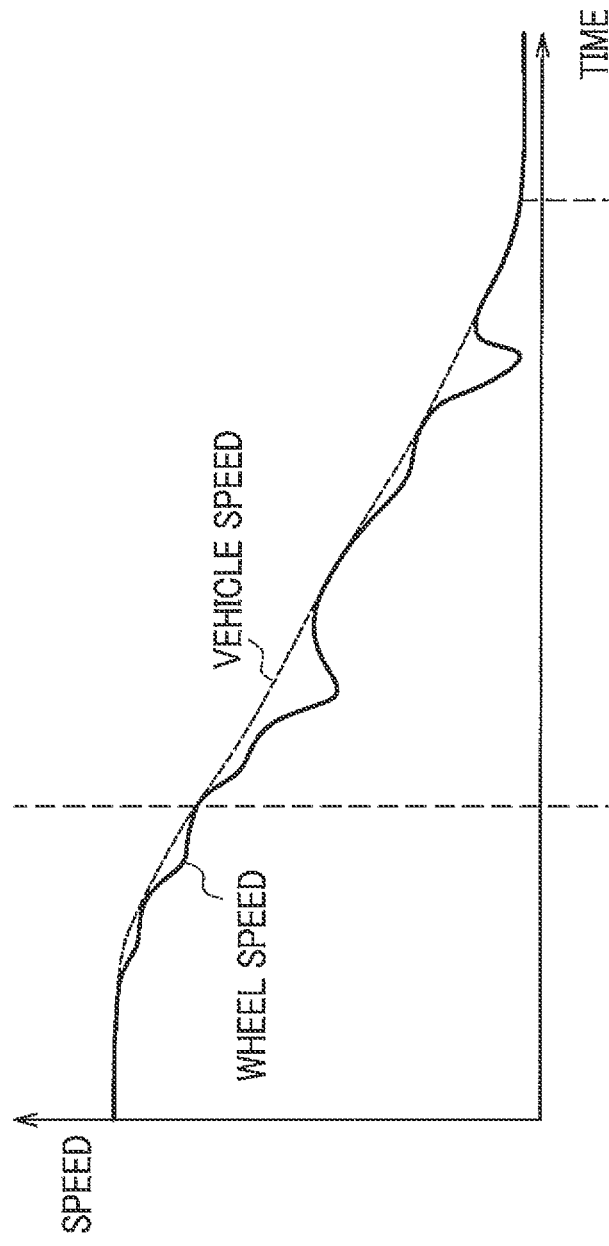
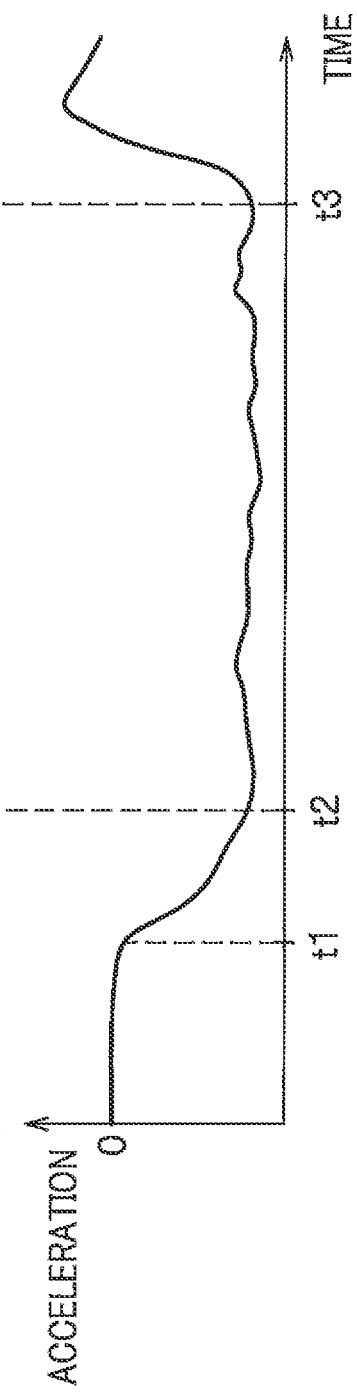
FIG. 5A
FIG. 5B

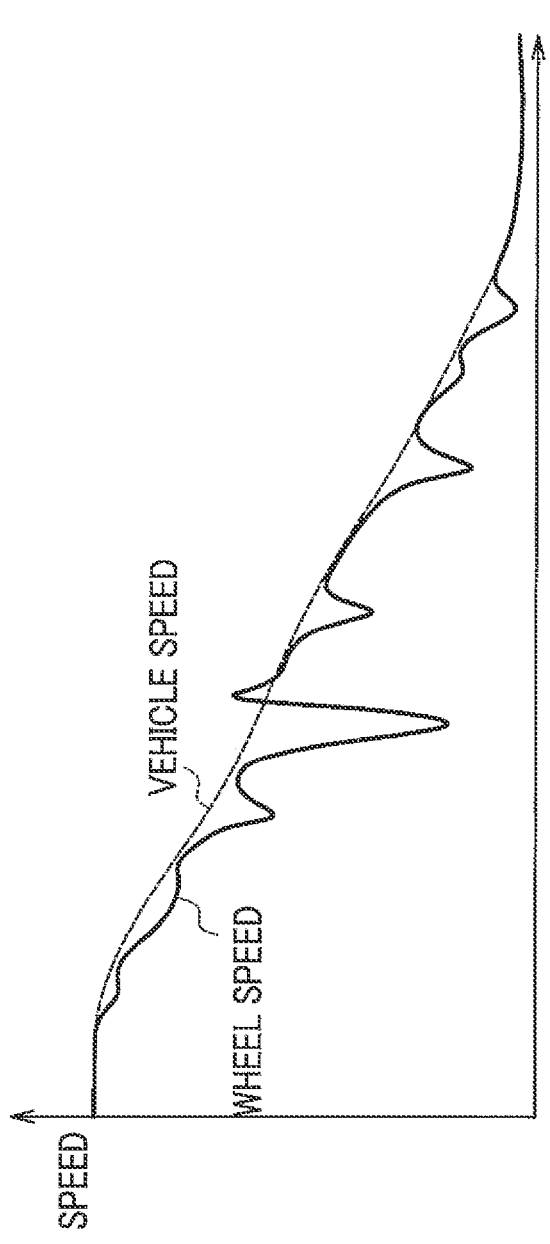
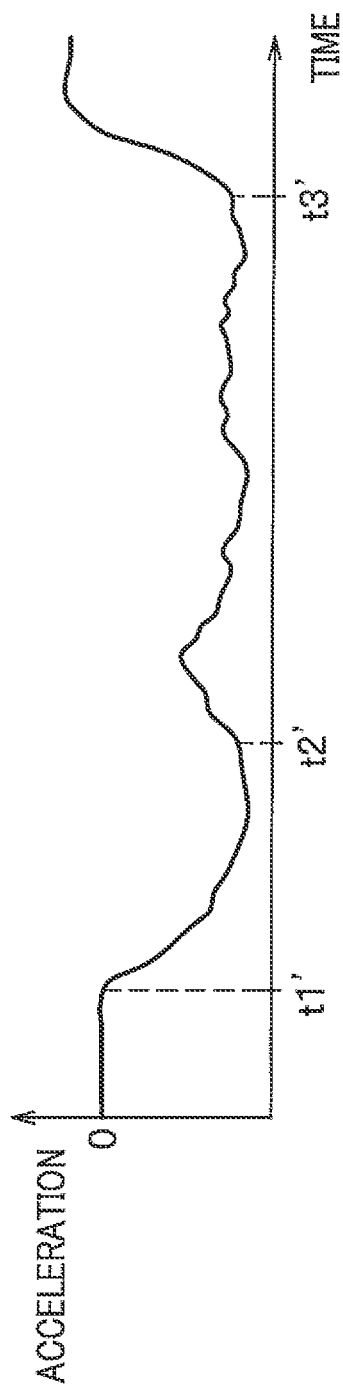

VEHICULAR BRAKE HYDRAULIC PRESSURE CONTROL APPARATUS

BACKGROUND OF THE INVENTION

1. Field of the Invention

The present invention relates to a vehicular brake hydraulic pressure control apparatus.

2. Description of the Related Art

When brakes are applied on a vehicle, such as an automatic four-wheel vehicle, the weight moves to the front wheels. As this phenomenon is significant for a vehicle with a high position of the center of gravity (a vehicle with a large weight transfer), it is possible for a vehicle with a large weight transfer to generate a large braking force, causing little slip of the front wheels.

On the other hand, a vehicle with a large weight transfer tends to cause weight swinging (pitching) during deceleration, and when the weight moves to the rear wheels the brake hydraulic pressure of the front wheels possibly become excessive to cause a slip.

As a known art, a technology for preventing such pitching is disclosed by Patent Document 1 (Japanese Patent No. 4529229). In the technology disclosed by Patent Document 1, the reference speed for a start of decreasing the pressure of the front wheels is adjusted to become higher, corresponding to the weight transfer, and the pressure decrease of the front wheels is controlled, while causing slipping. According to the technology by Patent Document 1, occurrence of an extreme weight transfer can be reduced.

However, in the technology disclosed by Patent Document 1, when strong braking operation is performed during low speed running, a large braking force is once generated and the front wheels are thereafter subjected to pressure decreasing control while causing a slip. Consequently, change in deceleration possibly becomes large to cause pitching.

SUMMARY OF THE INVENTION

In this situation, an object of the present invention is to provide a vehicular brake hydraulic pressure control apparatus capable of reducing pitching even when strong braking operation is performed during low speed running.

According to the present invention, a vehicular brake hydraulic pressure control apparatus includes: control valve units for switching between communication and shut-off of a fluid path communicated from a hydraulic pressure source to a wheel brake and switching between communication and shut-off of a fluid path communicated from the wheel brake to a reservoir; and a control section for performing pitching reducing control to reduce occurrence of pitching on a vehicle caused by swinging of a weight, by controlling the control valve units to switch respective brake hydraulic pressures that act on the respective wheel brakes between a pressure decreasing state, a holding state, and a pressure increasing state, wherein the control section performs the pitching reducing control, based on a weight distribution ratio between front wheels and rear wheels during deceleration, and includes: a distribution ratio calculating section for calculating the weight distribution ratio from deceleration of the vehicle; a vehicle speed calculating section for calculating a vehicle speed; and a determining section for determining whether or not to perform the pitching reducing control, and wherein the determining section determines to perform the pitching reducing control in case that conditions are satisfied, the conditions including at least that: the calculated vehicle speed is lower than a predetermined speed at which pitching tends to occur; and braking operation is being performed.

By such a vehicular brake hydraulic pressure control apparatus, in a state that the above-described conditions are satisfied, in other words, during low speed running by which pitching tends to occur, even when strong braking operation is performed, the determining section determines to perform pitching reducing control, based on the weight distribution ratio. Thus, weight transfer is reduced and pitching during braking is reduced.

Further, according to the invention, the control section controls the each control valve unit such that: if the weight distribution ratio is larger than or equal to a predetermined first threshold, the brake hydraulic pressure acting on the wheel brake turns into in the pressure decreasing state; and if the weight distribution ratio is smaller than the predetermined first threshold, the brake hydraulic pressure acting on the wheel brake be in the pressure increasing state or the holding state.

By such a vehicular brake hydraulic pressure control apparatus, if the weight distribution ratio of the front wheels is large and the weight transfer is excessive (if larger than the first threshold), pressure decreasing control is quickly performed and reduction in the weight transfer can be attained. Further, if the weight distribution ratio of the front wheels is not large and the weight transfer is not excessive (if smaller than the first threshold), the pressure increasing control or the holding control is performed. Thus, the current weight state is almost maintained, which reduces pitching and realizes effective braking suitable for the weight distribution ratio.

Still further, according to the invention, the control section controls the each control valve unit such that, if the weight distribution ratio is smaller than the first threshold and larger than or equal to a second threshold that is smaller than the first threshold, the brake hydraulic pressure acting on the wheel brake be in the pressure increasing state or the holding state.

By such a vehicular brake hydraulic pressure control apparatus, more appropriate pressure increasing control or holding control is performed. Thus, more effectively, weight transfer is reduced and pitching during braking is reduced.

Yet further, according to the invention, if the weight distribution ratio is smaller than the second threshold and conditions required for executing anti-lock brake control are satisfied, the control section performs the anti-lock brake control.

By such a vehicular brake hydraulic pressure control apparatus, in case that the weight distribution ratio is small and the weight transfer is small (smaller than the second threshold), if conditions required for executing anti-lock brake control are satisfied, anti-lock brake control is performed, and appropriate brake control (deceleration control) is thus performed.

Still further, according to the invention, the control section controls the each control valve unit such that, when an elapsed time of a control to make the brake hydraulic pressure acting on the wheel brake be in the holding state has become a predetermined time, the brake hydraulic pressure acting on the wheel brake turns into the pressure increasing state.

By such a vehicular brake hydraulic pressure control apparatus, when the elapsed time of controlling the brake hydraulic pressure to be in the holding state has become a predetermined time, it is recognized that pitching is stable, and then control is performed to turn the brake hydraulic pressure into the pressure increasing state. Thus, an increase in deceleration can be attained, and appropriate brake control can be performed.

According to the present invention, it is possible to obtain a vehicular brake hydraulic pressure control apparatus that can reduce pitching even when strong braking operation is performed during low speed running.

BRIEF DESCRIPTION OF THE DRAWINGS

FIG. 5A shows a temporal change in the speed in a case of performing pitching reducing control by the apparatus in the above embodiment, and FIG. 5B shows a temporal change in the deceleration; and FIG. 6A shows a temporal change in the speed in a case of performing anti-lock brake control by an apparatus in a comparative example, and FIG. 6B shows a temporal change in the deceleration.

DETAILED DESCRIPTION OF THE PREFERRED EMBODIMENT

Figure 1:
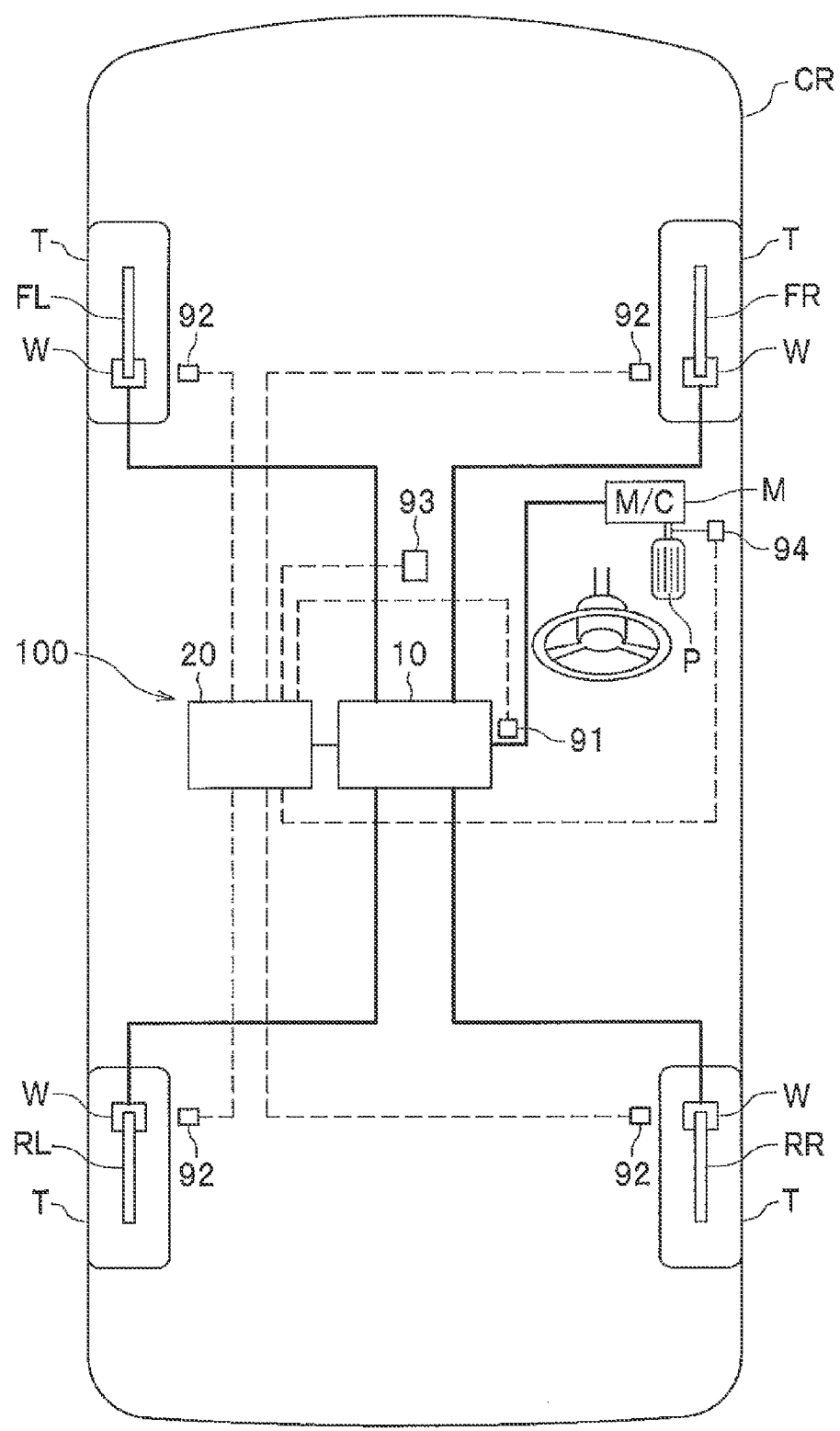
FIG. 1 is a configuration diagram showing a brake system of a vehicle provided with a vehicular brake hydraulic pressure control apparatus in an embodiment of the present invention.

An embodiment according to the present invention will be described below, referring to the drawings, as appropriate.

As shown in FIG. 1, a vehicular brake hydraulic pressure control apparatus 100 controls, as appropriate, braking forces (brake hydraulic pressures) applied to the respective wheels T of a vehicle CR. The vehicular brake hydraulic pressure control apparatus 100 mainly includes a hydraulic pressure unit 10 provided with oil paths and various components, and a control section 20 for appropriately controlling the various components in the hydraulic pressure unit 10. The control section 20 is connected with an acceleration sensor 93 for detecting the deceleration of the vehicle CR, and a pedal input sensor 94 for detecting that a brake pedal P is operated.

The control section 20 has two braking control modes, which are pitching reducing control that is based on the weight distribution ratio between a weight acting on the front wheels and a weight acting on the rear wheels during deceleration, and anti-lock brake control that is at least based on the wheel speed. In the description below, it is assumed that the vehicle CR is a front-wheel drive vehicle wherein the front wheels are driving wheels.

The front and rear four wheels T are respectively provided with a wheel brake FL, RR, RL, FR. Each of the wheel brakes FL, RR, RL, FR is provided with a wheel cylinder W that generates a braking force by a hydraulic pressure supplied from a master cylinder M, which is an example of a hydraulic pressure source. The master cylinder M and the wheel cylinders W are respectively connected to the hydraulic pressure unit 10. A brake hydraulic pressure generated by the master cylinder M corresponding to the pedal force (braking operation by the driver) of the brake pedal P is supplied through the hydraulic pressure unit 10 to the wheel cylinders W.

In addition to the above-described acceleration sensor 93 and the pedal input sensor 94, the control section 20 is connected with a pressure sensor 91 for detecting the hydraulic pressure in the master cylinder M and wheel speed sensors 92 for detecting the wheel speeds of the respective wheels T. The control section 20 is provided with, for example, a CPU, a RAM, a ROM and an input/output circuit. Based on input from the pressure sensor 91 and the wheel speed sensors 92 and programs and data stored in the ROM, the control section 20 performs various calculation processing, and thereby executes control to increase or decrease the hydraulic pressures of the wheel brakes FL, RR, RL, FR. The control section 20 will be described later in detail.

Figure 2:
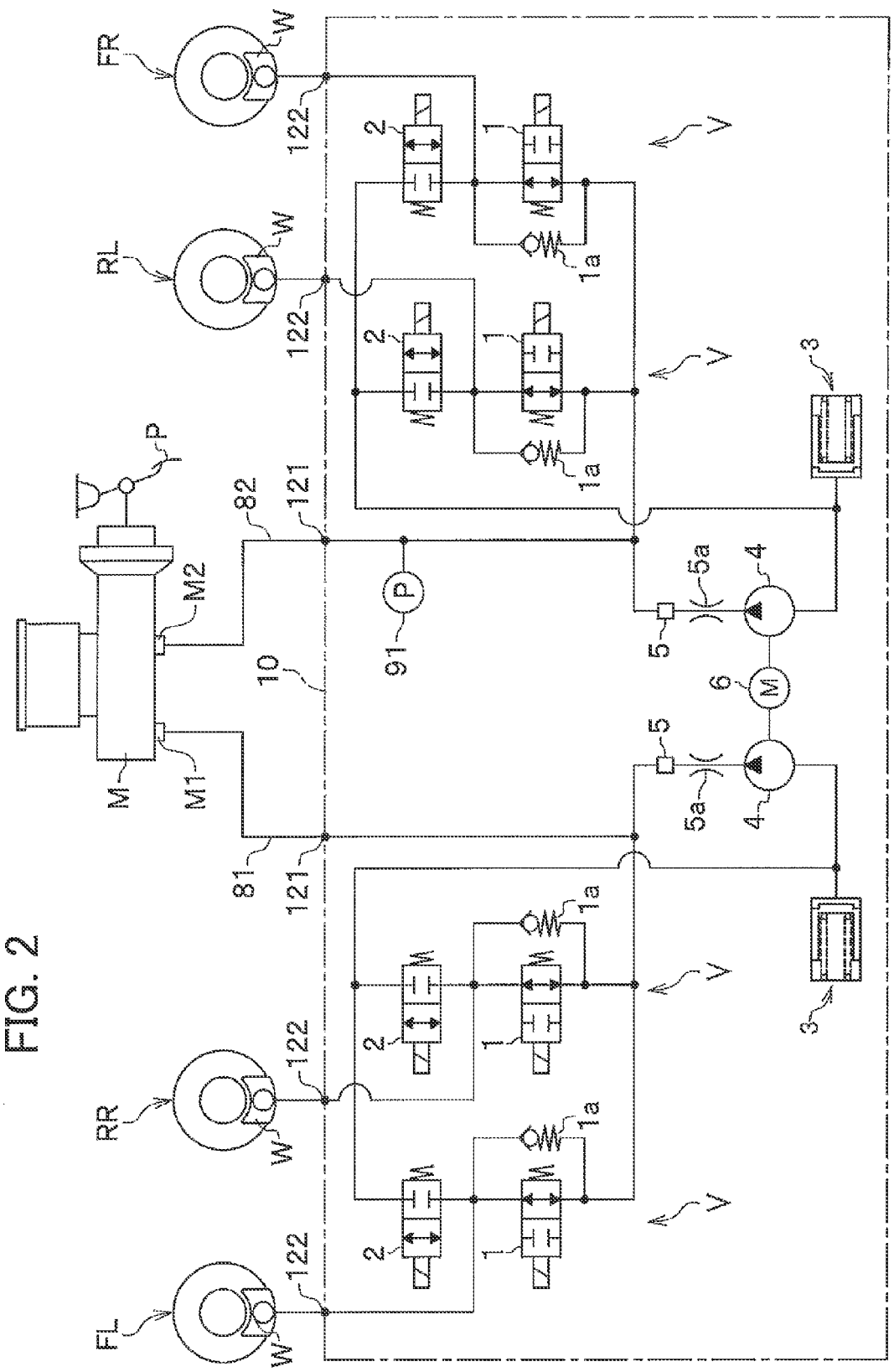
FIG. 2 is a hydraulic pressure circuit diagram of a hydraulic pressure unit.

As shown in FIG. 2, the hydraulic pressure unit 10 is disposed between the master cylinder M and the wheel brakes FL, RR, RL, FR. The two output ports M1, M2 of the master cylinder M are connected to the respective inlet ports 121 of the hydraulic pressure unit 10 through a pipe. The wheel brakes FL, RR, RL, FR are connected to the respective outlet ports 122 of the hydraulic pressure unit 10 through a pipe. Normally, hydraulic pressure paths are formed, communicated from the inlet ports 121 to the outlet ports 122 of the hydraulic pressure unit 10. Thus, a pedal force at the brake pedal P is transmitted to the respective wheel brakes FL, RR, RL, FR.

The hydraulic pressure unit 10 is provided with four control valve units V corresponding to the wheel brakes FL, RR, RL, FR. Each of the four control valve units V is provided with an inlet valve 1, an outlet valve 2, and a check valve 1a. Further, output hydraulic pressure paths 81, 82 corresponding to the output ports M1, M2 are respectively provided with a reservoir 3, a pump 4, a damper 5, and an orifice 5a. An electrical motor 6 is provided to drive the two pumps 4.

The inlet valves 1 are normally-open electromagnetic valves disposed on the hydraulic pressure path (the upstream side of the respective brakes FL, RR, RL, FR) from the master cylinder M to the respective wheel braked FL, RR, RL, FR. The inlet valves 1 are normally-open to allow a brake hydraulic pressure to transfer from the master cylinder M to the wheel brake FL, RR, RL, FR. Further, the inlet valves 1 shut off hydraulic pressure to be transferred from the brake pedal P to the respective wheel brakes FL, RR, RL, FR by being closed by the control section 20 when wheels T are going to be locked.

The outlet valves 2 are normally-closed electromagnetic valves disposed between the respective wheel brakes FL, RR, RL, FR and the corresponding reservoirs 3 (on the hydraulic pressure paths that are communicated from the hydraulic pressure paths on the wheel cylinders W side with respect to the respective inlet valves 1 to the reservoirs 3, the pumps 4, and the master cylinder M). Although the outlet valves 2 are normally closed, the control section 20 opens the outlet valves 2 when wheels T are nearly locked, and the outlet valves 2 thereby release hydraulic pressure applied to the respective wheel brakes FL, RR, RL, FR to the corresponding reservoirs 3.

The check valves 1a are connected with the respective inlet valves 1 in parallel. These check valves 1a allow only flow-in of brake fluid from the respective wheel brake FL, RR, RL, FR sides to the master cylinder M side. Even in a state that the inlet valves 1 are closed when input from the brake pedal P is stopped, the check valves 1a allow brake fluid to flow from the respective wheel brakes FL, RR, RL, FR sides to the master cylinder M side.

The reservoirs 3 have a function to reserve brake fluid that is released when the respective outlet valves 2 are released.

The pumps 4 have a function to suck brake fluid reserved by the reservoirs 3 and return the brake fluid to the master cylinder M through the orifices 5a.

When the control section 20 controls the open/closed state of the inlet valves 1 and the outlet valves 2, brake hydraulic pressures (hereinafter, also referred to as 'caliper hydraulic pressure') acting on the wheel cylinders W of the respective wheel brakes FL, RR, RL, FR are adjusted. For example, in the normal state that the inlet valves 1 are open and the outlet valves 2 are closed, if the brake pedal P is depressed, a hydraulic pressure from the master cylinder M is transferred as it is to the wheel cylinders W to turn the caliper hydraulic pressure into a pressure increasing state. In the state that the inlet valves 1 are closed and the outlet valves 2 are open, brake fluid flows from the respective wheel cylinders W to the reservoir 3 side so that the caliper hydraulic pressure decreases to be in a pressure decreasing state. In the state that the inlet valves 1 and the outlet valves 2 are both closed, a caliper hydraulic pressure is held to be in a holding state.

Figure 3:
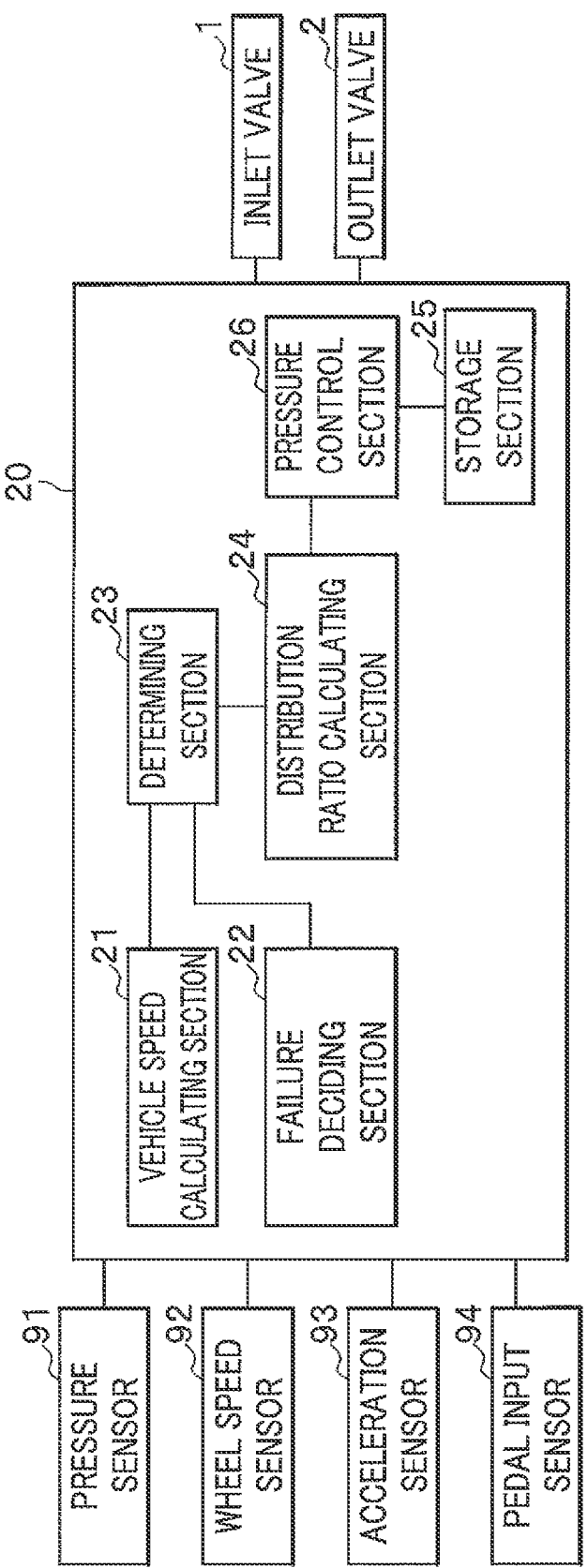
FIG. 3 is a block diagram of the main part of the vehicular brake hydraulic pressure control apparatus in the above embodiment of the invention.

The control section 20 will be described below in detail. The control section 20 controls the inlet valves 1 and the outlet valves 2, based on the later-described weight distribution ratio or at least the wheel speed. As shown in FIG. 3, to the control section 20, input are the brake hydraulic pressure of the master cylinder M, the wheel speeds obtained by the wheel speed sensors 92, the vehicle acceleration obtained by the acceleration sensor 93, and presence/absence of operation of the brake pedal P obtained by the pedal input sensor 94. The control section 20 in the present embodiment includes a vehicle speed calculating section 21, a failure deciding section 22, a determining section 23, a distribution ratio calculating section 24, a storage section 25, and a pressure control section 26.

The vehicle speed calculating section 21 calculates an estimated vehicle speed Va of the vehicle CR. A conventional known method can be applied as an estimating method, without particularly being limited. As an example, the vehicle speed can be determined by an average value calculated from four wheel speeds having been input from the wheel speed sensors 92. A calculated estimated vehicle speed is output to the determining section 23.

The failure deciding section 22 determines whether or not the acceleration sensor 93 is normally functioning (whether or not the deceleration is normal). For decision of a failure, a conventional known method can be applied, without particularly being limited. As an example, in detecting a failure, an input voltage is input from a sensor power source to the acceleration sensor 93, and presence/absence of a failure of the sensor is detected, based on the voltage value that is output from the sensor in response to the input of the input voltage. A decision result by the failure deciding section 22 is output to the determining section 23. Decision by the failure deciding section 22 may be performed at intervals of a predetermined time period with a timer, not shown, or may be performed only at the time of braking operation. Further, the decision may be made only at the time of ignition ON.

The determining section 23 determines whether or not to perform pitching reducing control that is based on the weight distribution ratio. Regarding a factor for determination, in case that both the below-described conditions are satisfied, the determining section 23 determines to perform pitching reducing control that is based on a weight distribution ratio. The above-described both conditions are that the estimated vehicle speed Va is lower than a predetermined speed Vo and that braking operation is being performed by the driver. That is, even when anti-lock brake control is being performed, the determining section 23 determines to perform pitching reducing control if both the above-described conditions are satisfied.

In case that either one of these conditions is unsatisfied, if conditions required for executing anti-lock brake control are satisfied, the determining section 23 determines to execute anti-lock brake control. A determination result by the determining section 23 is output to the pressure control section 26. In the above description, it is assumed (as one of conditions for determining to perform pitching reducing control) that the acceleration sensor 93 is normally functioning, and whether or not the acceleration sensor 93 is normally functioning is determined.

Whether or not the estimated vehicle speed Va is lower than the predetermined speed Vo can be determined, applying the estimated vehicle speed Va having been input from the vehicle speed calculating section 21.

Herein, the predetermined speed Vo is a speed at which pitching tends to occur when strong braking operation is performed during low speed running, and can be determined in advance through experiment or simulation.

Whether or not braking operation is being performed by the driver can be determined by presence/absence of an input signal from the pedal input sensor 94. Further, complementarily, whether or not braking operation is being performed by the driver can also be determined depending on whether or not the hydraulic pressure inside the master cylinder M is higher than a predetermined hydraulic pressure, which can be decided from the brake hydraulic pressure obtained by the pressure sensor 91.

Incidentally, the predetermined hydraulic pressure is set to a hydraulic pressure at which braking operation by the driver is ensured to be carried out and the wheel cylinders W work for braking.

Further, whether or not the acceleration sensor 93 is normally functioning can be determined by a decision result from the failure deciding section 22.

Herein, the distribution ratio calculating section 24 calculates a weight distribution ratio acting on the front wheels, from a weight acting on the front wheels and a weight acting on the rear wheels during deceleration. Concretely, representing the weight distribution ratio by $R_F$, the front wheel dynamic weight by WDF, the vehicle gravity center height by h, the wheel base length by L1, the vehicle weight by WT, the vehicle deceleration by $D_G$, and the front wheel static weight by WF, it is possible to obtain the weight distribution ratio $R_F$ by the following Expressions (1) and (2).

$$W_{DF} = \frac{h}{L1} \times W_T \times \frac{D_G}{9.8} + W_F \qquad \text{Expression 1}$$

$$R_F = \frac{W_{DF}}{W_T} \times 100 \qquad \text{Expression 2}$$

The storage section 25 stores a first threshold X1 and a second threshold X2 that are used in comparing the weight distribution ratio with the thresholds X1 and X2 by the pressure control section 26. Herein, the second threshold X2 is smaller than the first threshold X1. The first threshold X1 and the second threshold X2 are references for switching the brake hydraulic pressure, which acts in the wheel cylinders W during pitching reducing control, between the pressure decreasing state, the holding state, and the pressure increasing state, and can be determined in advance through experiment or simulation.

According to the determination result by the determining section 23, the pressure control section 26 decides which one of pitching reducing control based on the weight distribution ratio and anti-lock brake control is to be applied. Further, the pressure control section 26 decides in which one of the pressure decreasing state, the pressure increasing state, and the holding state the brake hydraulic pressure of the each wheel T is to be during brake control. Then, the pressure control section 26 executes brake control.

In case that the determination result by the determining section 23 is to execute pitching reducing control based on the weight distribution ration, the pressure control section 26 decides in which one of the above-described three states the brake hydraulic pressure is to be, based on the weight distribution ratio calculated by the distribution ratio calculating section 24.

The pressure control section 26 compares the weight distribution ratio $R_F$ calculated according to Expressions (1) and (2) and the first threshold X1 stored in the storage section 25. If the weight distribution ratio $R_F$ is larger than or equal to the first threshold X1, the pressure control section 26 determines to turn the caliper hydraulic pressure of the front wheels into the pressure decreasing state and controls the inlet valve 1 and the outlet valve 2 accordingly.

Further, if the weight distribution ratio $R_F$ is smaller than the first threshold X1, the pressure control section 26 compares the second threshold X2, which is smaller than the first threshold X1, and the weight distribution ratio $R_F$. If the weight distribution ratio $R_F$ is larger than or equal to the second threshold X2, the pressure control section 26 determines to make the caliper hydraulic pressure of the front wheels be in the pressure increasing state or in the holding state, and controls the inlet valve 1 and the outlet valve 2 accordingly.

Further, if the weight distribution ratio $R_F$ is smaller than the second threshold X2, even in case that the determining section 23 has determined to execute pitching reducing control based on the weight distribution ratio $R_F$, the pressure control section 26 makes a shift to brake control based on anti-lock brake control, and if conditions required for performing anti-lock brake control are satisfied, the pressure control section 26 controls the caliper hydraulic pressure of the front wheels to be in the pressure decreasing state, the pressure increasing state, or the holding state.

Incidentally, in the pitching reducing control, the pressure control section 26 determines whether or not the elapsed time of the holding state has exceeded a predetermined time, and when the elapsed time of the holding state has exceeded the predetermined time, the pressure control section 26 controls the caliper hydraulic pressure of the front wheels to turn into the pressure increasing state. If the elapsed time of the holding state has not exceeded the predetermined time, the pressure control section 26 controls the caliper hydraulic pressure of the front wheels to continue to be in the holding state.

Herein, the predetermined time is set to a time required for enabling, by continuance of the holding state, it to sufficiently perform pitching reducing control, and can be determined in advance through experiment or simulation.

Herein, anti-lock brake control refers to a control that controls the caliper hydraulic pressures of the respective wheels T to be in one of the pressure decreasing state, the pressure increasing state, and the holding state, based on the above-described estimated vehicle speed estimated from the wheel speeds and the slip ratios. For example, in case that a slip ratio becomes larger than a predetermined threshold and wheel acceleration is smaller than or equal to zero (Wheel deceleration is larger than or equal to zero.) (in other words, in case that a wheel T is nearly locked), the pressure control section 26 decides to make the caliper hydraulic pressure be in the pressure decreasing state. In case that the wheel acceleration is larger than zero, the pressure control section 26 decides to make the caliper hydraulic pressure be in the holding state. In case that the slip ratio becomes smaller than or equal to the predetermined threshold and the wheel acceleration is smaller than or equal to zero, the pressure control section 26 decides to make the caliper hydraulic pressure be in the pressure increasing state.

Incidentally, slip ratios can be obtained by a known calculating method, based on output from wheel speed sensors 92. As an example, a slip ratio can be obtained such that the difference (slip amount) between an estimated vehicle speed estimated from wheel speeds and a wheel speed is divided by the wheel speed.

Figure 4:
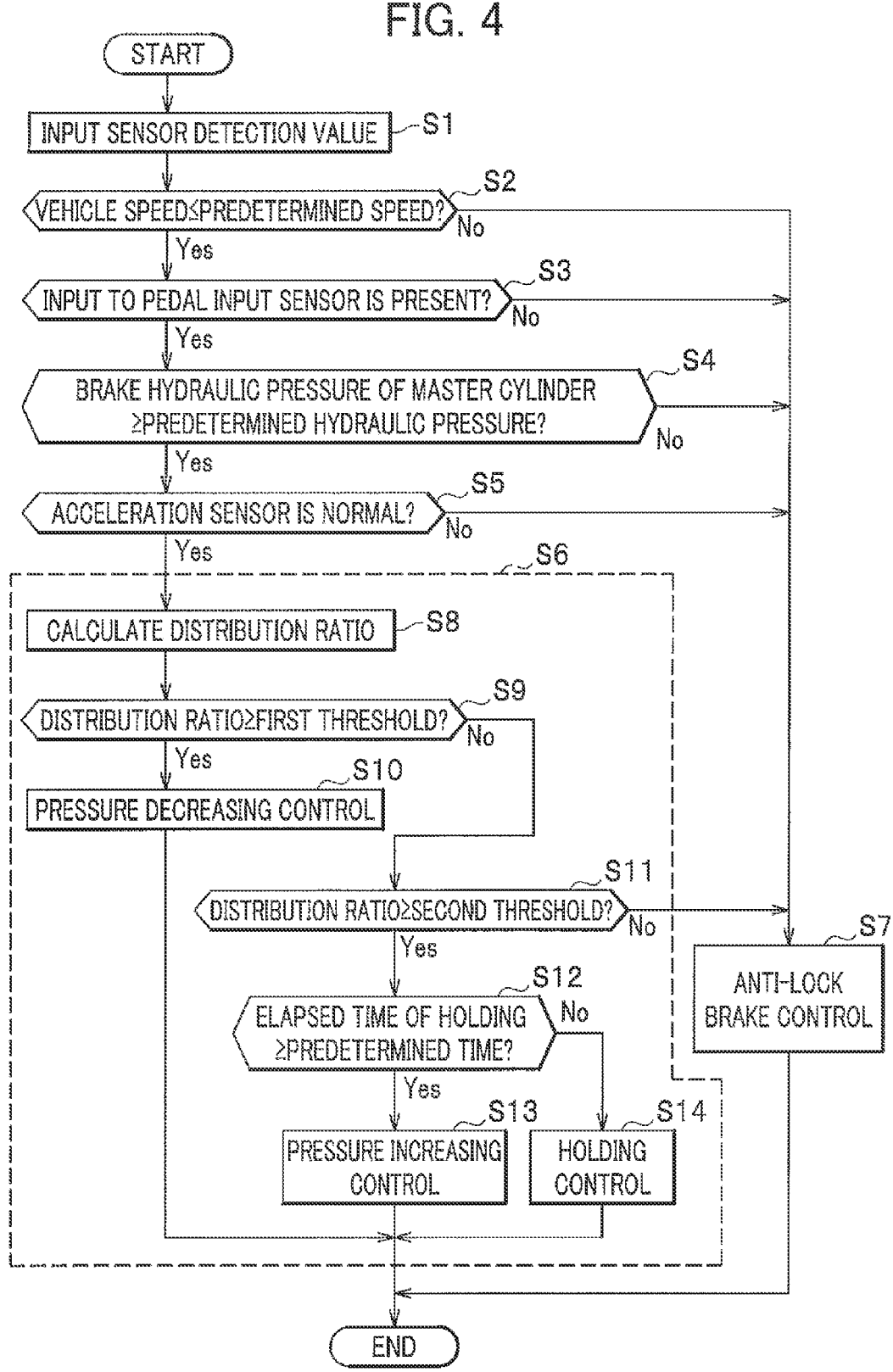
FIG. 4 is a flowchart showing the flow of a process by a control section.

The operation of the vehicular brake hydraulic pressure control apparatus 100, as described above, will be described below, referring to FIG. 4. FIG. 4 is a flowchart showing the flow of a process by the control section 20.

As shown in FIG. 4, first, various detection values are input to the control section 20 from the pressure sensor 91, the wheel speed sensors 92, the acceleration sensor 93, and the pedal input sensor 94 (S1). When wheel speeds are input from the wheel speed sensors 92, the vehicle speed calculating section 21 calculates the vehicle speed. Further, when a determination result is input from the acceleration sensor 93, the failure deciding section 22 decides whether or not the acceleration sensor 93 is in failure.

Then, the determining section 23 performs steps S2 to S5. That is, the determining section 23 determines whether or not the estimated vehicle speed Va calculated by the vehicle speed calculating section 21 is equal to or lower than the predetermined speed Vo (S2), and if lower (Yes), it is determined in step S3 whether or not an input to the pedal input sensor 94 is present. Further, if the estimated vehicle speed Va is higher than the predetermined speed Vo (No), the process proceeds to S7. If an input to the pedal input sensor 94 is present (Yes) in S3, it is determined whether or not the brake hydraulic pressure of the master cylinder M is higher than a predetermined hydraulic pressure in S4. If an input to the pedal input sensor 94 is absent (No) in S3, the process proceeds to S7.

In S4, if the brake hydraulic pressure of the master cylinder M is equal to or higher than a predetermined hydraulic pressure (Yes), it is determined whether or not the acceleration sensor 93 is normally functioning in S5, and if the brake hydraulic pressure of the master cylinder M is lower than the predetermined hydraulic pressure (No) in S4, the process proceeds to S7.

Incidentally, the order of S2 to S5 may be changed, and the S2 to S5 may be simultaneously performed.

In S5, if it is determined that the acceleration sensor 93 is normally functioning (Yes), the process proceeds to S6, and the determining section 23 determines to execute pitching reducing control based on the weight distribution ratio. On the other hand, if it is determined in S5 that the acceleration sensor 93 is malfunctioning (No), the process proceeds to S7. In S7, the determining section 23 does not execute pitching reducing control based on the weight distribution ratio, but the anti-lock brake control is executed by the pressure control section 26 in case that conditions required for executing anti-lock brake control are satisfied.

When pitching reducing control based on the weight distribution ratio is executed in S6, the distribution ratio calculating section 24 calculates the weight distribution ratio $R_F$ in S8, and then it is determined whether or not the weight distribution ratio $R_F$ is larger than or equal to the first threshold X1 in S9. In S9, if it is determined that the weight distribution ratio $R_F$ is larger than or equal to the first threshold X1 (Yes), the process proceeds to S10, and the pressure control section 26 performs control (pressure decreasing control) to turn the caliper hydraulic pressure into the pressure decreasing state. That is, in case of a state that the weight distribution ratio $R_F$ of the front wheels is large and pitching tends to occur (Yes in S2 to S5), the caliper hydraulic pressure turns into the pressure decreasing state no matter whether or not the front wheels actually turn into a slipping state.

On the other hand, if it is determined that the weight distribution ratio $R_F$ is smaller than the first threshold X1 (No) in S9, then it is determined whether or not the weight distribution ratio $R_F$ is equal to or larger than the second threshold X2 in S11. If it is determined that the weight distribution ratio $R_F$ is equal to or larger than the second threshold X2 (Yes) in S11, then it is determined whether or not the elapsed time of the holding state is equal to or larger than the predetermined time in S12.

If it is determined that the weight distribution ratio $R_F$ is smaller than the second threshold X2 (No) in S11, then the process proceeds to S7 so that pitching reducing control based on the weight distribution ratio $R_F$ is switched to anti-lock brake control, and if conditions required for executing anti-lock brake control are satisfied, the anti-lock brake control is executed.

If the elapsed time of the holding state is equal to or larger than the predetermined time (Yes in S12), the pressure control section 26 controls the caliper hydraulic pressure to be in the pressure increasing state (pressure increasing control) in S13. That is, the holding state is switched to the pressure increasing state by S12 and S13.

Still further, if the elapsed time of the holding time is not larger than the predetermined time (No in S12), the pressure control section 26 continues the control (holding control) to have the caliper hydraulic pressure be in the holding state (holding control) in S14. That is, the holding state is continued for the predetermined time, and occurrence of pitching is thereby satisfactorily reduced.

By the process described above, the vehicular brake hydraulic pressure control apparatus 100 in the present embodiment performs control as shown in FIGS. 5A and 5B. In FIG. 5A, temporal changes in the vehicle speed and a wheel speed during deceleration are shown, overlapping with each other, and in FIG. 5B, a temporal change in acceleration during deceleration is shown.

As shown in FIGS. 5A and 5B, when strong braking operation is performed during low speed running, anti-lock brake control is started. Then, deceleration becomes large from time t1. The weight transfer accordingly increases, then anti-lock brake control is shifted to pitching reducing control at time t2, and pitching reducing control based on the weight distribution ratio $R_F$ is started. That is, after time t2, based on the weight distribution ratio $R_F$, control for one of the pressure decreasing state, the pressure increasing state, and the holding state is appropriately selected, and thus deceleration control is performed. Thus, from time t2 to time t3 that is immediately before the vehicle CR nearly stops, a substantially flat vehicle deceleration $D_G$ can be obtained, and weight transfer is thereby reduced to satisfactorily reduce the pitching of the vehicle CR.

Incidentally, even in case that anti-lock brake control has not been started, if conditions required for executing pitching reducing control are satisfied, then pitching reducing control is started.

FIGS. 6A and 6B show a comparative example. The apparatus in this comparative example only performs anti-lock brake control based on at least the wheel speed. When strong braking operation is performed during low speed running, anti-lock brake control is started, however, the weight transfer increases at a vehicle deceleration $D_G$ which increases from time t1', and pitching occurs from time t2'. Accordingly, the wheel speed tends to suddenly change to deteriorate brake feeling.

In contrast, in the present embodiment, by pitching reducing control based on the weight distribution ratio $R_F$, substantially flat vehicle deceleration $D_G$ is continued, and occurrence of pitching can be thereby satisfactorily reduced.

As has been described above, by the vehicular brake hydraulic pressure control apparatus 100 in the present embodiment, even in a state that the determination section 23 determines that all conditions are satisfied, in other words, even in case that strong braking operation is performed during low speed running in which pitching tends to occur by strong braking operation, pitching reducing control based on the weight distribution ratio $R_F$ is executed, and the weight transfer is thereby reduced, which reduces pitching during braking.

Further, in case that the weight distribution ratio $R_F$ of the front wheels is large and the weight transfer is excessive (larger than or equal to the first threshold X1), pressure decreasing control is quickly performed and reduction in the weight transfer can be attained. Still further, in case that the weight distribution ratio $R_F$ of the front wheels is not large and the weight transfer is not excessive (smaller than the first threshold X1), pressure increasing control or holding control is performed so that the current weight state is almost maintained. Thus, pitching is reduced, and effective braking matching with the weight distribution ratio $R_F$ can also be realized.

Yet further, in case that the weight distribution ratio $R_F$ is smaller than the first threshold X1 and larger than or equal to the second threshold X2, which is smaller than the first threshold X1, the control section 20 controls the control valve units V so that the caliper hydraulic pressure of the front wheels be in the pressure increasing state or the holding state. Thus, more appropriate pressure increasing control or holding control is performed, which more effectively reduces the weight transfer to reduce pitching during braking.

Further, in case that the weight distribution ratio $R_F$ is smaller than the second threshold X2 and conditions required for executing anti-lock brake control are satisfied, the control section 20 executes anti-lock brake control. Accordingly, in case that the weight distribution ratio $R_F$ is small and the weight transfer is small (smaller than the second threshold X2), appropriate brake control (deceleration control) can be performed by performing anti-lock brake control.

Further, in case that the elapsed time of controlling the caliper hydraulic pressure to be in the holding state has exceeded the predetermined time, the control section 20 controls the control valve units V so that the caliper hydraulic pressure of the front wheels turn into the pressure increasing state. In such a manner, if the elapsed time of controlling the caliper hydraulic pressure to be in the holding state has exceeded the predetermined time, the control section 20 recognizes that pitching is stable and performs control of the caliper hydraulic pressure to turn into in the pressure increasing state. Thus, increasing of the vehicle deceleration $D_G$ can be attained, and appropriate brake control can be performed.

An embodiment of the present invention has been described above, however, the invention can be carried out with changes and modification, as appropriate, without being limited to the above-described embodiment.

For example, although arrangement has been made such that the vehicle deceleration $D_G$ is obtained by the acceleration sensor 93, without being limited thereto, for example, by estimating the vehicle deceleration $D_G$ from the wheel speeds or the like, the vehicle deceleration DG of the vehicle CR may be determined.

What is claimed is:

1. A vehicular brake hydraulic pressure control apparatus, comprising:
   control valve units for switching between communication and shut-off of a fluid path communicated from a hydraulic pressure source to a wheel brake and switching between communication and shut-off of a fluid path communicated from the wheel brake to a reservoir; and
   a control section for performing pitching reducing control to reduce occurrence of pitching on a vehicle caused by swinging of a weight, by controlling the control valve units to switch respective brake hydraulic pressures that act on the respective wheel brakes under a pressure decreasing state, a holding state, and a pressure increasing state,
   wherein the control section performs the pitching reducing control, based on a weight distribution ratio between front wheels and rear wheels during deceleration, and comprises:
   a distribution ratio calculating section for calculating the weight distribution ratio from deceleration of the vehicle detected from an acceleration sensor;
   a vehicle speed calculating section for calculating a vehicle speed; and
   a determining section for determining whether or not to perform the pitching reducing control,
   and wherein the determining section determines to perform the pitching reducing control in case that conditions are satisfied, the conditions including at least that:
   the calculated vehicle speed is lower than a predetermined speed at which pitching tends to occur; and
   braking operation is being performed.

2. The vehicular brake hydraulic pressure control apparatus according to claim 1,
   wherein the control section controls the each control valve unit such that:
   if the weight distribution ratio is larger than or equal to a predetermined first threshold, the brake hydraulic pressure acting on the wheel brake be in the pressure decreasing state; and
   if the weight distribution ratio is smaller than the predetermined first threshold, the brake hydraulic pressure acting on the wheel brake be in the pressure increasing state or the holding state.

3. The vehicular brake hydraulic pressure control apparatus according to claim 2,
   wherein the control section controls the each control valve unit such that, if the weight distribution ratio is smaller than the first threshold and larger than or equal to a second threshold that is smaller than the first threshold, the brake hydraulic pressure acting on the wheel brake be in the pressure increasing state or the holding state.

4. The vehicular brake hydraulic pressure control apparatus according to claim 3,
   wherein if the weight distribution ratio is smaller than the second threshold and a condition/conditions required for executing anti-lock brake control are satisfied, the control section performs the anti-lock brake control.

5. The vehicular brake hydraulic pressure control apparatus according to claim 1,
   wherein the control section controls the each control valve unit such that, when an elapsed time of a control to make the brake hydraulic pressure acting on the wheel brake be in the holding state has become a predetermined time, the brake hydraulic pressure acting on the wheel brake turns into the pressure increasing state.

6. The vehicular brake hydraulic pressure control apparatus according to claim 2,
   wherein the control section controls the each control valve unit such that, when an elapsed time of a control to make the brake hydraulic pressure acting on the wheel brake be in the holding state has become a predetermined time, the brake hydraulic pressure acting on the wheel brake turns into the pressure increasing state.

7. The vehicular brake hydraulic pressure control apparatus according to claim 3,
   wherein the control section controls the each control valve unit such that, when an elapsed time of a control to make the brake hydraulic pressure acting on the wheel brake be in the holding state has become a predetermined time, the brake hydraulic pressure acting on the wheel brake turns into the pressure increasing state.

8. The vehicular brake hydraulic pressure control apparatus according to claim 4,
   wherein the control section controls the each control valve unit such that, when an elapsed time of a control to make the brake hydraulic pressure acting on the wheel brake be in the holding state has become a predetermined time, the brake hydraulic pressure acting on the wheel brake turns into the pressure increasing state.

9. The vehicular brake hydraulic pressure control apparatus according to claim 1, further comprising:
   a failure deciding section for determining whether or not the acceleration sensor is normally functioning,
   wherein the pitching reducing control is performed only when the failure deciding section determines that the acceleration sensor is normally functioning.

* * * * *